(12) United States Patent
Liang et al.

(10) Patent No.: US 8,493,369 B2
(45) Date of Patent: Jul. 23, 2013

(54) FOLDABLE STYLUS AND PEN WITH PROTECTIVE HOUSING

(75) Inventors: Shi-Xu Liang, Shenzhen (CN); Chuan-I Liu, Shindian (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 419 days.

(21) Appl. No.: 12/862,867

(22) Filed: Aug. 25, 2010

(65) Prior Publication Data

US 2011/0291999 A1   Dec. 1, 2011

(30) Foreign Application Priority Data

Jun. 1, 2010 (CN) .......................... 2010 1 0189530

(51) Int. Cl.
  *G06F 3/033* (2013.01)
  *G06F 3/041* (2006.01)
  *G06K 11/06* (2006.01)
  *G08C 21/00* (2006.01)

(52) U.S. Cl.
  USPC ........................................ 345/179; 178/19.01

(58) Field of Classification Search
  USPC ............................. 178/19.01–19.07; 345/179
  See application file for complete search history.

(56) References Cited

U.S. PATENT DOCUMENTS

| | | | | |
|---|---|---|---|---|
| 4,149,812 | A * | 4/1979 | Huffman, Jr. | 401/6 |
| 5,061,104 | A * | 10/1991 | Florjancic | 401/195 |
| D429,888 | S * | 8/2000 | Coopersmith et al. | D4/108 |
| 6,464,419 | B1 * | 10/2002 | Chan | 401/131 |
| D498,259 | S * | 11/2004 | Kung | D19/46 |
| D526,682 | S * | 8/2006 | Ortiz et al. | D19/36 |
| 7,146,667 | B2 * | 12/2006 | Elsener | 7/118 |
| 2006/0143874 | A1 * | 7/2006 | Cetera | 24/10 R |
| 2010/0090988 | A1 * | 4/2010 | Park | 345/179 |
| 2010/0302213 | A1 * | 12/2010 | Yeh | 345/179 |

FOREIGN PATENT DOCUMENTS

EP  1354672 B1 * 10/2009

* cited by examiner

*Primary Examiner* — Ariel Balaoing
*Assistant Examiner* — Larry Sternbane
(74) *Attorney, Agent, or Firm* — Altis Law Group, Inc.

(57) ABSTRACT

A stylus includes a housing, a stylus body and a first rotating member. The stylus body includes a tip. The first rotating member is coupled between the housing and the stylus body so the stylus body rotatably engages with the housing. The tip moves from one side of the first rotating member to another side of the first rotating member, when the stylus body rotates relative to the housing.

12 Claims, 7 Drawing Sheets

FOLDABLE STYLUS AND PEN WITH PROTECTIVE HOUSING

CROSS-REFERENCE TO RELATED APPLICATIONS

The present application is related to co-pending U.S. patent application (application Ser. No. 12/862,868), entitled "STYLUS", by Liang et al. This application has the same assignee as the present application and has been concurrently filed herewith. The above-identified applications are incorporated herein by reference.

BACKGROUND

1. Technical Field

This exemplary disclosure generally relates to retractable/extendable styluses.

2. Description of Related Art

It is well-known that a variety of devices include a touch screen. Examples of such devices include smart phones, personal digital assistants (PDA), pagers, and personal organizers. These devices typically include a display module under the touch screen. The display module generates target images associated with menu options, programs, user choices, and other operations. The user controls the device by pressing the touch screen over the target image with a stylus. However, typical styluses have no other function like a pen for writing on a paper.

Therefore, there is room for improvement within the art

BRIEF DESCRIPTION OF THE DRAWINGS

Many aspects of the exemplary stylus can be better understood with reference to the following drawings. The components in the various drawings are not necessarily drawn to scale, the emphasis instead being placed upon clearly illustrating the principles of the exemplary stylus. Moreover, in the drawings, like reference numerals designate corresponding parts throughout the diagrams.

DETAILED DESCRIPTION

In this exemplary embodiment, the stylus is used to contact a touch screen display of an electronic device such as a mobile telephone. The mobile telephone described herein is a representation of the type of wireless communication device that may benefit from the exemplary embodiment. However, it is to be understood that the exemplary embodiment may be applied to any type of hand-held or portable device including, but not limited to, the following devices: radiotelephones, cordless phones, paging devices, personal digital assistants, portable computers, pen-based or keyboard-based handheld devices, remote control units, portable media players (such as an MP3 or DVD player) that have wireless communication capability. Accordingly, any reference herein to the mobile telephone should also be considered to apply equally to other portable wireless electronic devices.

Figure 1:
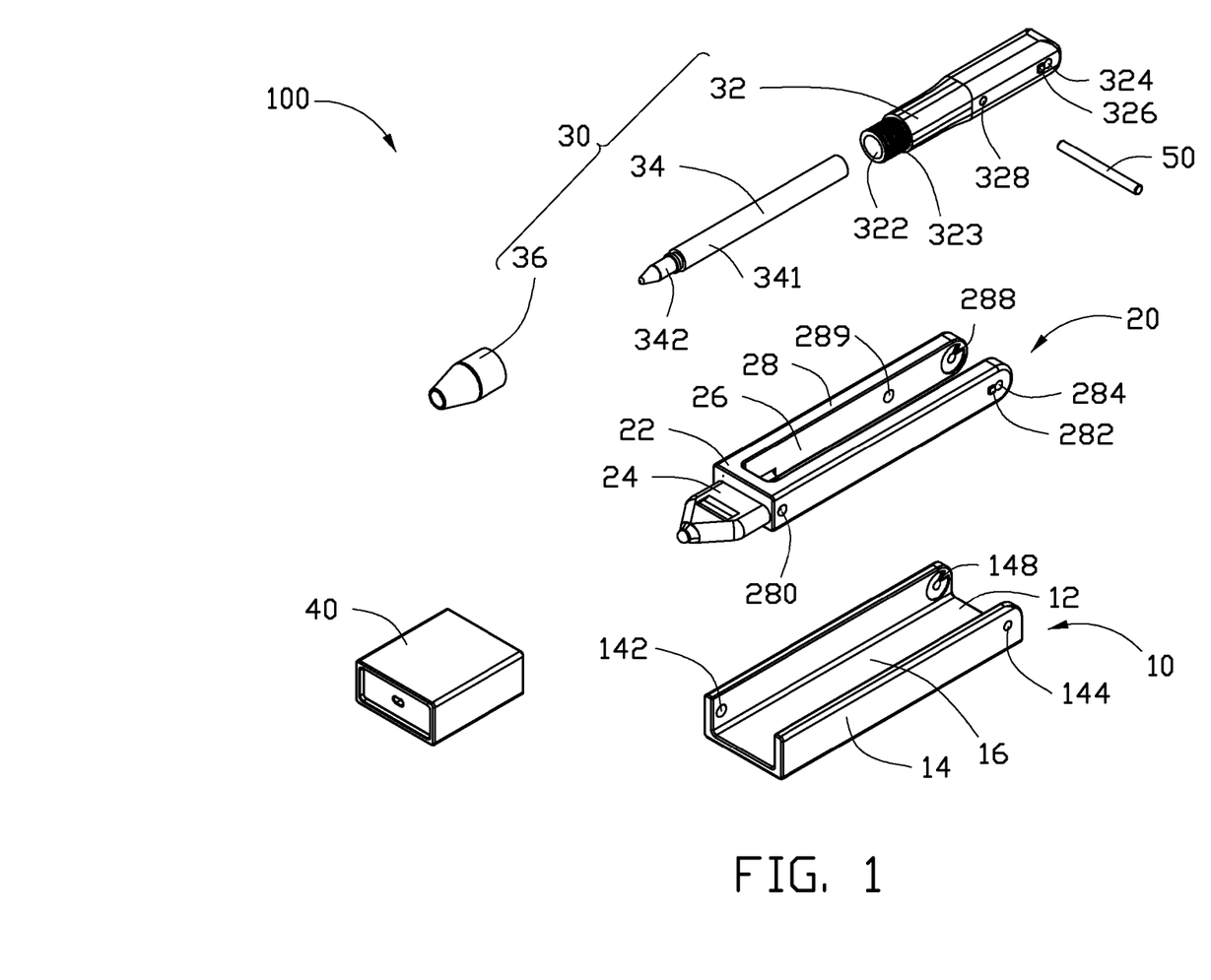
FIG. 1 is an exploded view of an exemplary embodiment of a stylus.
Figure 2:
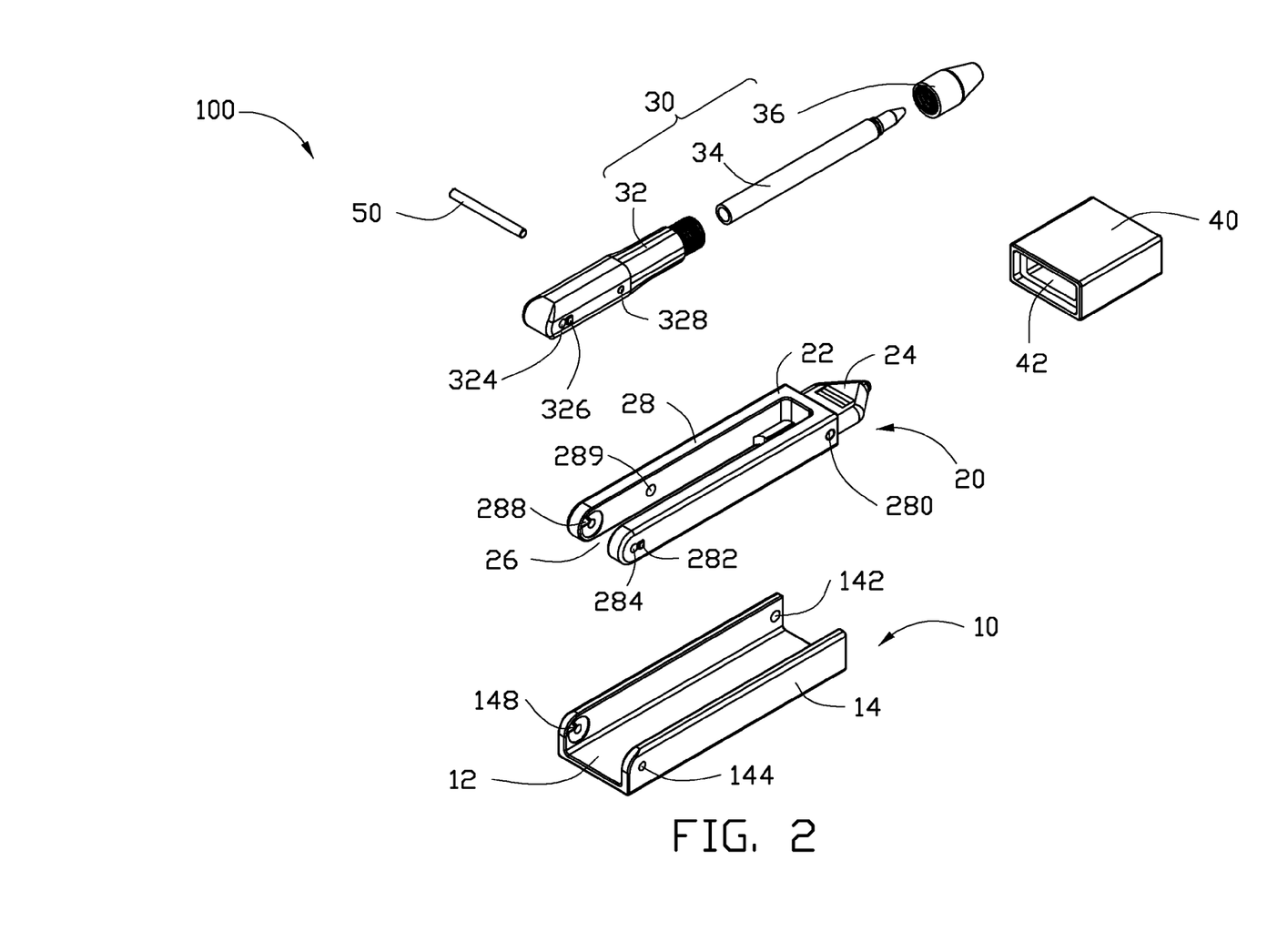
FIG. 2 is an exploded view of the stylus shown in FIG. 1 in another aspect.

Referring to FIGS. 1 and 2, a stylus 100 includes a housing 10, a stylus body 20, a pen 30 and a cap 40. The stylus body 20 is rotatably coupled to the housing 10 by a first rotating member (not labeled), and the pen 30 is rotatably coupled to the housing 10 by a second rotating member (not labeled). In a closed state shown in FIG. 3, the stylus body 20 is located in the housing 10 and the pen 30 is also located in the housing 10 so the stylus 100 is shortened to improve the portability of the stylus 100. In a first open state shown in FIG. 5, the stylus body 20 and the pen 30 are both rotated relative to the housing 10 to lengthen the stylus 100 to improve the convenience of using the stylus body 20. In a second open state shown in FIG. 6, the stylus body 20 is located in the housing 10 while the pen 30 is rotated relative to the housing 10 and the stylus body 20 so the pen 30 slides out of the housing 10, thereby the pen 30 is ready for use.

Figure 3:
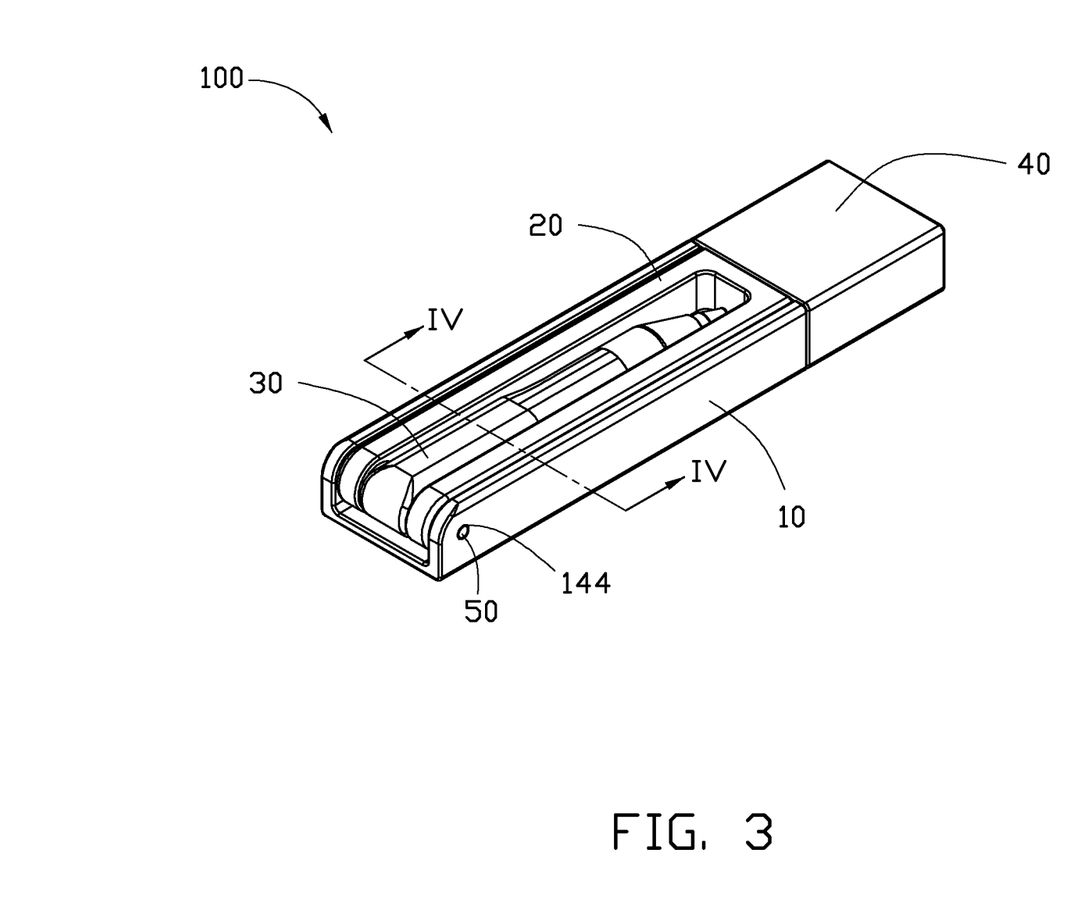
FIG. 3 is an assembled view of the stylus shown in FIG. 2.
Figure 4:
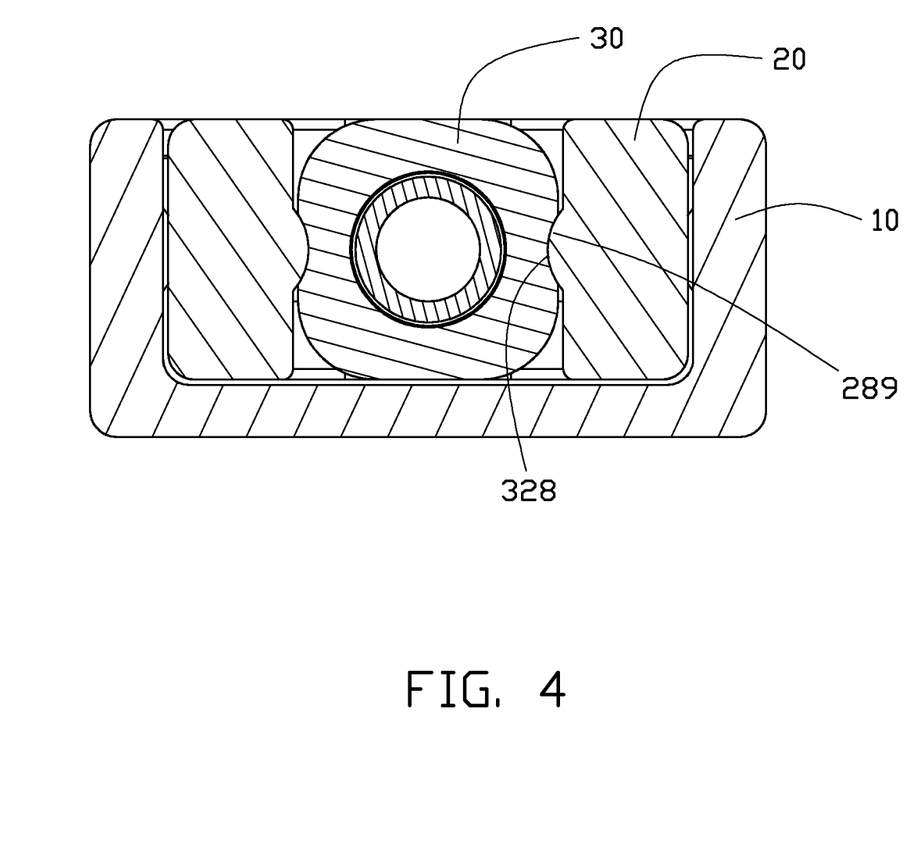
FIG. 4 is a cross-sectional view of the stylus in FIG. 3 along the line IV-IV, and wherein the stylus is in a closed state.

Referring to FIGS. 1 and 3, the housing 10 includes a bottom wall 12 and two opposite sidewalls 14 protruding from the bottom wall 12, and a groove 16 is defined between the bottom wall 12 and the sidewalls 14 for accommodating the stylus body 20 and the pen 30. The stylus body 20 includes a body 22 having a first body end (not labeled), a second body end (not labeled) opposite to the first body end, and a tip 24 protruding from the first body end. The tip 24 is used to contact a touch screen display of an electronic device (not shown). The stylus body 20 further defines a receiving space 26 for accommodating the pen 30 when the stylus 100 is in the closed state shown in FIG. 3. In this exemplary embodiment, two substantially parallel and opposite panels 28 define the receiving space 26. The pen 30 may include a shell 32 defining a compartment 322 therein, a threaded portion 322 formed on an outer surface of the shell 32, a pen body 34 including a main body 34 and a head 342 protruding from one end of the main body 34, and a cover 36. The main body 34 is accommodated in the compartment 322 and the head 342 extends out of the compartment 322. The cover 36 is screwed on the threaded portion 322 to hold the pen body 34 in the compartment 322. The cap 40 defines a receptacle 42 (shown in FIG. 2) for receiving the tip 24 therein for protection of the tip 24.

Referring to FIGS. 1-3, the first rotating member pivotally connects the housing 10 with the stylus body 20 so that the stylus body 20 rotatably engages with the housing 10. The first rotating member, in this exemplary embodiment, includes a pin 50, and two aligned apertures 284 that engage the pin 50. Each aperture 284 is defined though one of the panels 28. The pin 50 is retained on the housing 10 and rotatably extending into the apertures 284 so the stylus body 20 can rotate about the pin 50 relative to the housing 10. The pin 50 may be retained on the housing 10 in such a way that each sidewall 14 of the housing 10 defines a retaining hole 144 and each end of the pin 50 is retained (e.g., hot-melted) in one of the retaining holes 144.

Referring to FIGS. 1-3, the second rotating member is coupled between the housing 10 and the pen 30 in a manner that the pen 30 rotatably engages with the housing 10. The second rotating member, in this exemplary embodiment, includes the pin 50, and a pin hole 324 that accommodates the pin 50. The pin hole 324 is transversely defined through the shell 32. The pin 50 rotatably extends into the pin hole 324 so the pen 30 can rotate about the pin 50 relative to the housing 10.

Referring to FIGS. 1-3, a first stopping member (not labeled) is coupled between the housing 10 and the stylus body 20. The first stopping member provides a mechanism for holding the stylus body 20 in the closed state shown in FIG. 3, i.e., holding the stylus body 20 in the groove 16. The first stopping member, in this embodiment, includes a set of first protrusions 280 and a set of first slots 142 that engage the first protrusions 280. The first protrusions 280 are positioned on the stylus body 20 and the first slots 142 are positioned on the housing 10. Each protrusion 280 is latched in one of the first slots 142 to hold the stylus body 20 in the closed state shown in FIG. 3. It is understood that one of ordinary skill in the art will appreciate that the first stopping member that includes the first protrusions 280 and the first slots 142 are only one example. It is also understood that the first protrusions 280 may be positioned on either the stylus body 20 or the housing 10 and the protrusion engaging members (e.g. first slots 142) may be positioned on the element opposite the first protrusions 280.

Figure 7:
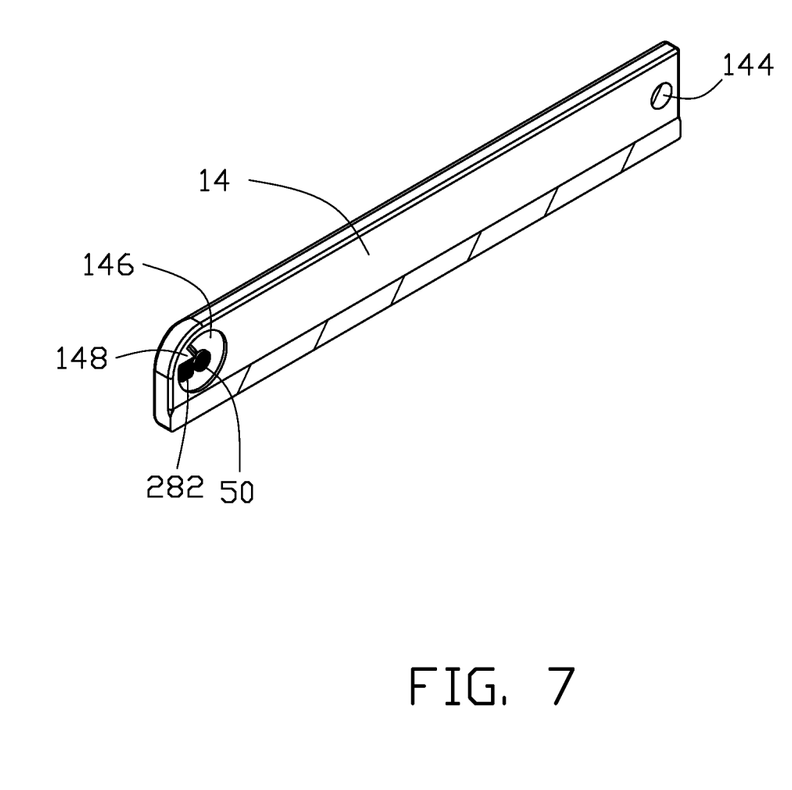
FIG. 7 is a cross-sectional view of the stylus in FIG. 5.

Referring to FIGS. 1-3, a second stopping member (not labeled) is coupled between the housing 10 and the stylus body 20. The second stopping member provides a mechanism for holding the stylus body 20 in the first open state shown in FIG. 5 so the stylus 100 is lengthened to facilitate using it. The second stopping member, in this embodiment, includes a set of first blocks 282 and a set of first projections 148 that engage the first blocks 282. The first blocks 282 are positioned on the stylus body 20 and the first projections 148 are positioned on the housing 10. Referring to FIG. 7, each first block 282 resists against one of the first projections 148 to hold the stylus body 20 in the first open state shown in FIG. 5. It is understood that one of ordinary skill in the art will appreciate that the second stopping member including the first blocks 282 and the first projections 148 are only one example. It is also understood that the first blocks 282 may be positioned on either the stylus body 20 or the housing 10 and the first block engaging members (e.g. first projections 148) may be positioned on the element opposite the first blocks 282.

Referring to FIGS. 1-3, a third stopping member (not labeled) is coupled between the stylus body 20 and the pen 30. The third stopping member provides a mechanism for holding the pen 30 in the closed state shown in FIG. 3. The third stopping member, in this embodiment, includes a set of second protrusions 328 and a set of second slots 289 that engage the second protrusions 328. The second protrusions 328 are positioned on the pen 30 and the second slots 289 are positioned on the stylus body 20. Each second protrusion 328 is latched in one of the first slots 289 to hold the pen 30 in the closed state shown in FIG. 3. It is understood that one of ordinary skill in the art will appreciate that the third stopping member comprises the second protrusions 328 and the second slots 289 are only one example. It is also understood that the second protrusions 328 may be positioned on either the stylus body 20 or the pen 30 and the second protrusion engaging members (e.g. second slots 289) may be positioned on the element opposite the second projections.

Referring to FIGS. 1-3, a fourth stopping member (not labeled) is coupled between the stylus body 20 and the pen 30. The fourth stopping member provides a mechanism for holding the pen 30 in the second open state shown in FIG. 6. The fourth stopping member, in this embodiment, includes a set of second blocks 326 and a set of second projections 288 that engage the second blocks 326. The second blocks 326 are positioned on the pen 30 and the second projections 288 are positioned on the stylus body 20. Each second block 326 resists against one of the second projections 288 to hold the pen 30 in the second open state shown in FIG. 6. It is understood that one of ordinary skill in the art will appreciate that the fourth stopping member including the second blocks 326 and the second projections 288 are only one example. It is also understood that the second blocks 326 may be positioned on either the stylus body 20 or the pen 30 and the second block engaging members (e.g. second projections 288) may be positioned on the element opposite the second blocks 326.

Referring to FIGS. 1-4, to assemble the stylus 100, the pen body 34 is inserted into the compartment 322, and the cover 36 is screwed on the threaded portion 342 to form an assembled pen 30. The pen 30 is put into the receiving space 26 with the pin hole 324 aligned with the apertures 284 and the second protrusions 328 latched respectively in the second slots 289. The stylus body 20 is received in the groove 16 with the apertures 284 aligned with the retaining hole 144 and the first protrusions 280 latched respectively in the first slots 142. The pin 50 is inserted in the retaining hole 144, the apertures 284 and the pin hole 324. Finally, the cap 40 is covering the tip 24 to complete assembly of the stylus 100.

Figure 5:
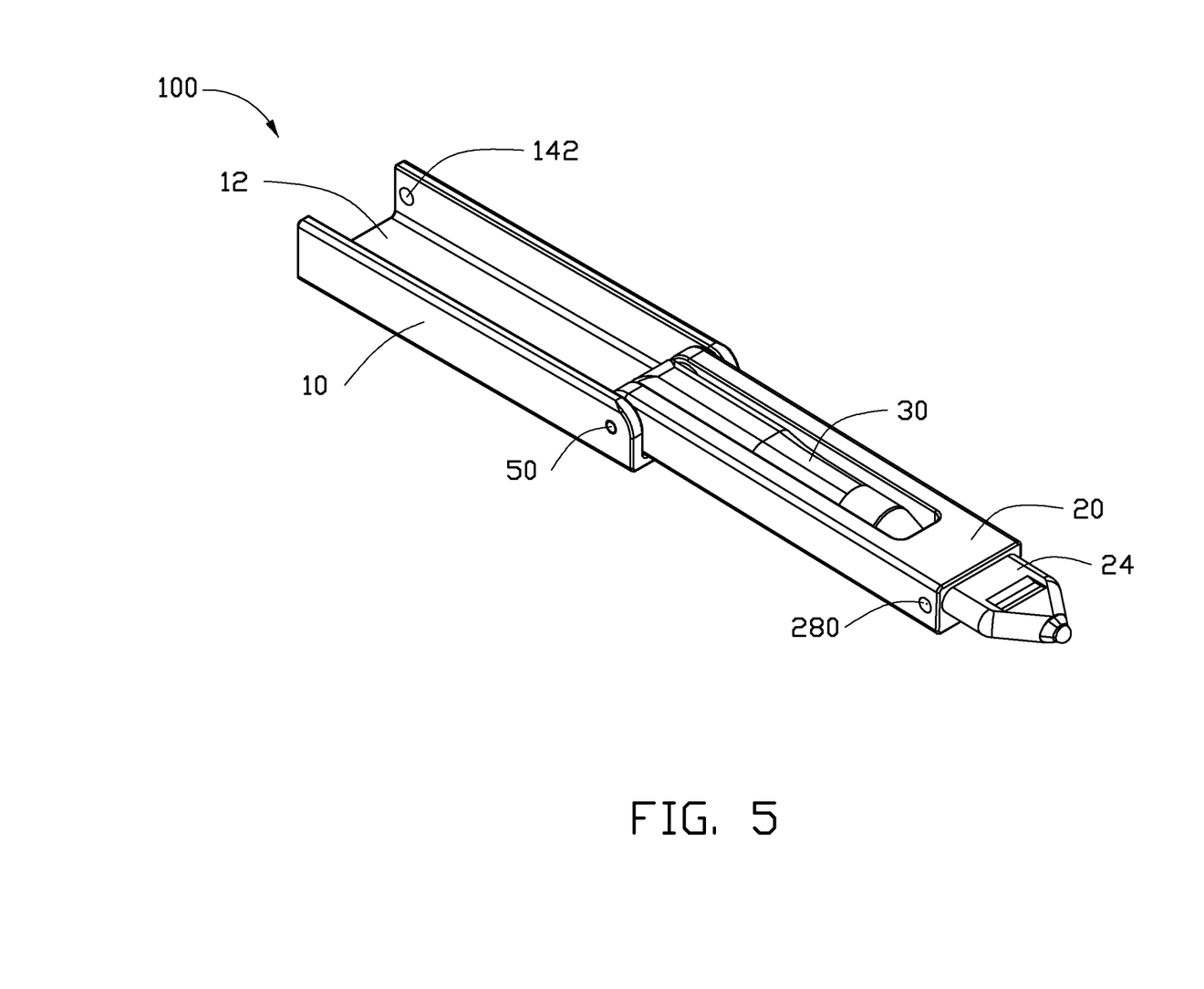
FIG. 5 is similar to FIG. 3, but wherein a stylus body is rotated relative to a housing and a cap is removed from the stylus body.
Figure 6:
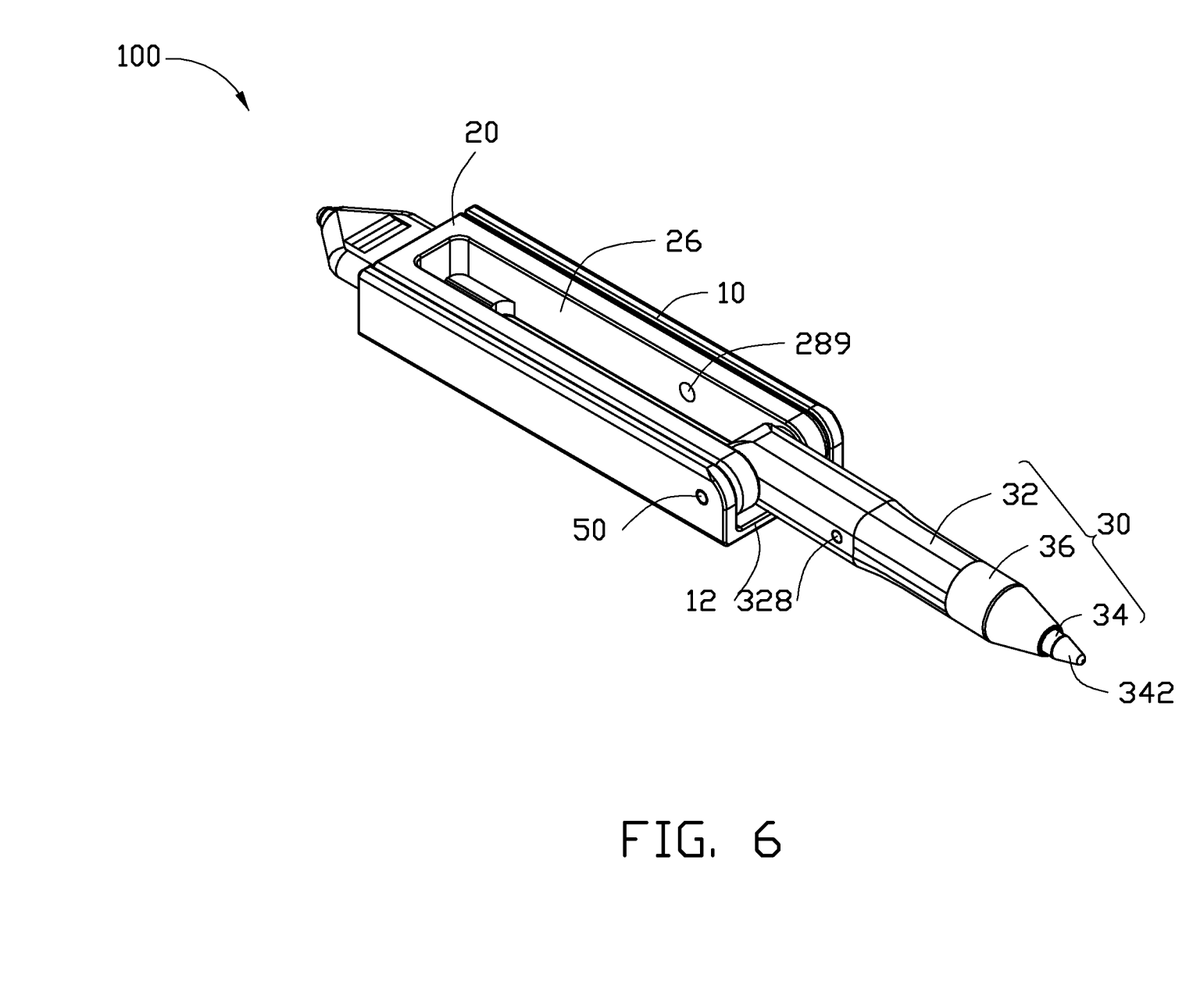
FIG. 6 is similar to FIG. 3, but wherein a pen is rotated relative to the stylus body and the cap is removed from the stylus body.

Referring to FIGS. 3 and 5, in operation, the stylus body 20 may rotate together with the pen 30 about the pin 50 relative to the housing 10 to make the first protrusions 280 slide out of the first slot, until the tip 24 moves from a first side of the pin 50 to a second side of the pin 50. Thus, the stylus body 20 slides out of the groove 16 to lengthen the stylus 100 for facilitating using the stylus 100. At this time, the first blocks 282 resist against the first projections 148 to hold the stylus body 20 in the first open state. Referring to FIG. 6, the pen 30 may singly rotate about the pin 50 relative to the housing 10 to make the second protrusions 328 slide out of the second slots 289, until the head 342 moves from the first side of the pin 50 to the second side of the pin 50. At this time, the second blocks 326 resist against the second projections 288 to hold the pen 30 in the second open state.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:
1. A stylus, comprising:
 a housing having a groove defined therein;
 a stylus body comprising a tip, two parallel and opposite panels, and a receiving space defined by the panels, each panel having an aperture defined therethrough;
 a pen comprising a head, and a pin hole opposite to the head and transversely defined through the pen;
 a pin retained on the housing and rotatably extending into the pin hole and the aperture of each panel, so that the pin rotatably mounts the stylus body and the pen to the housing;
 wherein when the stylus is in a closed state, the tip and the head are both located at a first side of the pin, the stylus body is accommodated in the groove, and the head of the pen is accommodated in the receiving space; when the stylus is in a first open state, the tip and the head are both located at a second side of the pin opposite to the first side of the pin, the stylus body rotates out of the groove with the head of the pen accommodated in the receiving space; when the stylus is in a second open state, the tip is located in the first side of the pin with the stylus body received in the groove while the head is located at the second side of the pin.

2. The stylus as claimed in claim 1, wherein the housing includes a bottom wall and two opposite sidewalls protruding from the bottom wall, and the groove is defined between the bottom wall and the sidewalls.

3. The stylus as claimed in claim 2, wherein the pin is retained on the housing in such a way that each sidewall of the housing defines a retaining hole and each end of the pin is retained in one of the retaining holes.

4. The stylus as claimed in claim 3, wherein a first stopping member is coupled between the housing and the stylus body to hold the stylus body in the closed state.

5. The stylus as claimed in claim 4, wherein the first stopping member includes a set of first protrusions and a set of first slots that detachably engage the first protrusions, the first protrusions are positioned on the stylus body and the first slots are defined on the housing, each protrusion is latched in one of the first slots to hold the stylus body in the closed state.

6. The stylus as claimed in claim 5, wherein a second stopping member is coupled between the housing and the stylus body to hold the stylus body in the first open state.

7. The stylus as claimed in claim 6, wherein the second stopping member includes a set of first blocks and a set of first projections that engage the first blocks, the first blocks are positioned on the stylus body and the first projections are positioned on the housing, each first block resists against one of the first projections to hold the stylus body in the first open state.

8. The stylus as claimed in claim 1, wherein a third stopping member is coupled between the stylus body and the pen to hold the pen in the closed state.

9. The stylus as claimed in claim 8, wherein the third stopping member includes a set of second protrusions and a set of second slots that engage the second protrusions, the second protrusions are positioned on the pen and the second slots are positioned on the stylus body, each second protrusion is latched in one of the first slots to hold the pen in the closed state.

10. The stylus as claimed in claim 1, wherein the pen further comprises a shell, and a pen body, the shell defines a compartment therein; the pen body includes a main body, the head protrudes from one end of the main body; the main body is accommodated in the compartment and the head extends out of the compartment.

11. The stylus as claimed in claim 10, where in the pen further comprises a cover, a threaded portion is formed on an outer surface of the shell, the is screwed on the threaded portion to hold the pen body in the compartment.

12. A stylus, comprising:
   a housing having a groove defined therein;
   a stylus body comprising a tip, two parallel and opposite panels, and a receiving space defined by the panels, each panel having an aperture defined therethrough;
   a pen comprising a head, and a pin hole opposite to the head and transversely defined through the pen;
   a pin retained on the housing and rotatably extending into the pin hole and the aperture of each panel, so that the pin rotatably mounts the stylus body and the pen to the housing;
   wherein when the stylus is in a closed state, the stylus body is accommodated in the groove, the head of the pen is accommodated in the receiving space; when the stylus body rotates about the pin relative the housing from a closed state to a first open state, the tip moves from a first side of the pin to a second side of the pin opposite to the first side of the pin; when the pen rotates about the pin relative to the housing from the close state to a second open state, the head moves from the first side of the pin to the second side of the pin opposite to the first side of the pin.

\* \* \* \* \*